US007737995B2

(12) United States Patent
Vronay et al.

(10) Patent No.: US 7,737,995 B2
(45) Date of Patent: Jun. 15, 2010

(54) GRAPHICAL USER INTERFACE SYSTEM AND PROCESS FOR NAVIGATING A SET OF IMAGES

(75) Inventors: David Vronay, Beijing (CN); Shuo Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1285 days.

(21) Appl. No.: 11/069,806

(22) Filed: Feb. 28, 2005

(65) Prior Publication Data

US 2006/0193538 A1  Aug. 31, 2006

(51) Int. Cl.
G09G 5/02 (2006.01)
(52) U.S. Cl. .......................... 345/619; 345/698; 345/27
(58) Field of Classification Search ................. 345/619, 345/698, 27
See application file for complete search history.

(56) References Cited

U.S. PATENT DOCUMENTS

| | | | | | |
|---|---|---|---|---|---|
| 5,880,709 | A | * | 3/1999 | Itai et al. ..................... | 345/629 |
| 5,903,756 | A | * | 5/1999 | Sankar ....................... | 717/106 |
| 6,084,598 | A | * | 7/2000 | Chekerylla .................. | 345/441 |
| 6,236,682 | B1 | * | 5/2001 | Ota et al. ................ | 375/240.16 |
| 6,456,745 | B1 | * | 9/2002 | Bruton et al. ............... | 382/298 |
| 6,769,615 | B2 | * | 8/2004 | Resseguie ................... | 235/449 |
| 6,792,434 | B2 | * | 9/2004 | Moghaddam et al. ..... | 707/104.1 |
| 6,807,307 | B2 | * | 10/2004 | Jahng et al. ................. | 382/225 |
| 7,028,050 | B1 | * | 4/2006 | Rose ......................... | 707/104.1 |
| 7,068,309 | B2 | * | 6/2006 | Toyama et al. ............. | 348/231.5 |
| 7,130,864 | B2 | * | 10/2006 | Lin et al. .................. | 707/104.1 |
| 7,167,910 | B2 | * | 1/2007 | Farnham et al. ............ | 709/223 |
| 7,199,787 | B2 | * | 4/2007 | Lee et al. .................... | 345/169 |
| 7,343,365 | B2 | * | 3/2008 | Farnham et al. ................ | 707/1 |
| 7,425,963 | B2 | * | 9/2008 | Gargi et al. .................. | 345/589 |
| 7,441,194 | B2 | * | 10/2008 | Vronay et al. ............... | 715/738 |
| 7,472,356 | B2 | * | 12/2008 | Vronay et al. ............... | 715/828 |
| 2003/0084065 | A1 | * | 5/2003 | Lin et al. .................. | 707/104.1 |
| 2004/0223058 | A1 | * | 11/2004 | Richter et al. ............. | 348/207.1 |
| 2005/0002584 | A1 | * | 1/2005 | Qian et al. ................... | 382/253 |
| 2005/0034075 | A1 | * | 2/2005 | Riegelman et al. ........... | 715/714 |
| 2006/0048076 | A1 | * | 3/2006 | Vronay et al. ............... | 715/850 |
| 2006/0125937 | A1 | * | 6/2006 | LeGall et al. ........... | 348/240.99 |
| 2006/0126944 | A1 | * | 6/2006 | Loui et al. .................... | 382/224 |
| 2006/0251384 | A1 | * | 11/2006 | Vronay et al. ................. | 386/52 |
| 2006/0253783 | A1 | * | 11/2006 | Vronay et al. ............... | 715/730 |

(Continued)

OTHER PUBLICATIONS

Efficient Image Segmentation for Semantic Object Generation Chen Xiaotang Yu Yinglin (Dept. of Comm. & Info. Eng., South China Univ. of Technology, Guangzhou 510640), vol. 19 No. 2 Journal of Electronics Apr. 2002.*

(Continued)

*Primary Examiner*—Javid A Amini
(74) *Attorney, Agent, or Firm*—Lyon & Harr, LLP; Richard T. Lyon

(57) ABSTRACT

A system and process for navigating unstructured or loosely structured image sets on a display screen is presented. These image sets are navigated by grouping each image thereof into clusters and arranging the clusters in a left-to-right or up-and-down manner. A set number of the clusters are displayed to a viewer. The viewer can then scroll through and select another cluster in the arrangement as desired. Within a cluster, images are arranged in a grid in a sequence order based on a sequence number assigned to each in the clustering procedure. The viewer is also able to zoom into a selected cluster to, in effect, successively form smaller sub-clusters until only a single image is displayed in a cluster under consideration. In addition, the viewer can zoom out again in a similar manner.

20 Claims, 7 Drawing Sheets

U.S. PATENT DOCUMENTS

2007/0106780 A1* 5/2007 Farnham et al. ............. 709/223
2007/0185656 A1* 8/2007 Schadt ........................ 702/19

OTHER PUBLICATIONS

Cluster analysis and display of genome-wide expression patterns, Michael B. Eisen, Paul T. Spellman, Patrick O. BROWN†, and David Botstein, Proc. Natl. Acad. Sci. USA vol. 95, pp. 14863-14868, Dec. 1998.*

Time as Essence for Photo Browsing Through Personal, Digital Libraries, Adrian Graham, Hector Garcia-Molina, Andreas Paepcke, Terry Winograd, Copyright 2002 ACM.*

* cited by examiner

GRAPHICAL USER INTERFACE SYSTEM AND PROCESS FOR NAVIGATING A SET OF IMAGES

BACKGROUND

1. Technical Field

The invention is related to image navigation, and more particularly to a system and process for navigating unstructured or loosely structured image sets displayed in clusters on a display screen.

2. Background Art

There are many applications in which the user must browse large quantities of unstructured or loosely structured images. For example, personal computer users often have folders containing digital photo collections saved on their computers. Another example is the ever growing number of large image databases, which are accessible by a computer user over a network, such as the Internet or a proprietary intranet. These images do not need to be physical images. Rather, they can be computer-generated images or models, or even text-based documents (such as word processor documents, spreadsheets or presentation slides). The image data set could even be a collection of thumbnail images of web pages that a user previously visited. In essence, the image data set can be a collection of any digital images of any kind.

Unfortunately, browsing through a large set of images can be cumbersome. In some cases the only clue as to the subject of an image is a filename. This forces a viewer to scan through a long list of filenames, which may not even be particularly descriptive of the subject of the associated image. Thus, browsing requires the viewer to guess whether a particular filename refers to subject matter he or she is interested in, and then opening or downloading the image file to display it, in order to determine if it actually pertains subject matter of interest. This can be a time consuming process in a large image database.

Some large public image databases have image files that include meta-data descriptions of the subject matter of the associated image. This facilitates a keyword search approach for finding images that would be of interest to a viewer. More sophisticated interfaces exist that allow a viewer to identify images using example images or sketches. While these keyword search and image feature schemes can be an effective way of identifying images, they do not provide the capability to "explore" the contents of a large set of images.

Another way a large set of images has been presented to a viewer is to simply display a grid of small thumbnail versions of the images. This has the advantage of giving the viewer a visual representation of the image set. However, with no organizations the viewer must scan through all the images to identify those that are of interest.

Accordingly, there is a need for a user interface that provides an organized visual representation of unstructured or loosely structured image sets that allows the viewer to efficiently browse and explore without the need to rely on filenames, keyword searches, or image features searches.

SUMMARY

The present invention is directed toward a system and process for a viewer to navigate unstructured or loosely structured image sets on a display screen that overcomes the aforementioned problems. Large quantities of this unstructured or loosely structured image data such as a digital photo collection can be efficiently browsed using clustering techniques to create subgroups with similar characteristics. More particularly, these collections are navigated by grouping each image in the collection into clusters and arranging the clusters in a left to right or up and down manner. A set number of the clusters are displayed to a viewer and a one of the displayed clusters is automatically selected (e.g., the middle cluster). The viewer can then scroll through and select another cluster in the arrangement as desired. This scrolling provides a convenient, one dimensional navigation process that is almost automatic to most computer users. Thus, a viewer can search through the groups of images for ones of interest in an intuitive, almost unconscious, manner. This allows the viewer to concentrate on the images and the story they tell, rather than the mechanics of the navigation itself. Within a cluster, images are arranged in a grid in a sequence order based on a sequence number assigned to it in the clustering process. In one embodiment, the images are displayed in a grid pattern such that adjacent images are offset from each other in relation to the columns and rows of the grid. The viewer is also able to zoom into a selected cluster to, in effect, successively form smaller sub-clusters until only a single image is displayed in a cluster under consideration. In addition, the view can zoom out again in a similar manner. The selected cluster is highlighted in a manner that makes it visually distinguishable from the non-selected clusters to assist the viewer in identifying it.

More particularly, the present image navigation system and process involves computing a maximum cluster area, which is defined as the maximum area on the viewer's display screen that can be used to display each of a group of clusters, given a maximum number of clusters that are to be displayed at any one time, an overall area on the display screen dedicated to displaying the clusters and a minimum spacing between clusters. Next, a maximum number of images that can be contained in each cluster is computed given a minimum permissible image size and the maximum cluster area. The images of the image set under consideration are then clustered into sequential clusters having no more than the maximum number of images each. Once clustered, a group of consecutive clusters is displayed on the viewer's display screen. The number of clusters displayed does not exceed the aforementioned number of clusters that are to be displayed at any one time.

Once the initial clustering is displayed, the viewer is free to scroll through the clusters as described previously. In addition, the viewer can also zoom in, and then out of a selected cluster.

Zooming in on a cluster displayed on the display screen essentially involves increasing the last established minimum permissible image size by a set zoom-in factor and re-clustering. More particularly, in one embodiment of the present system and process, zooming in first involves computing a revised maximum number of images that can be contained in each cluster. This is done by dividing the maximum cluster area by the increased minimum permissible image size. Next, the images of the cluster being zoomed in on are clustered into sequential "zoomed-in" clusters having no more than the revised maximum number of images in each cluster. A group of the consecutive zoomed-in clusters is displayed on the viewer's display screen. Here again, the number of clusters in the group of zoomed-in clusters does not exceed the aforementioned number of clusters that are to be displayed at any one time. However, it is noted that whenever the minimum permissible image size becomes so large that it is no longer possible to display the maximum number of clusters in their entirety in the overall area on the display screen dedicated to displaying the clusters, only the number of clusters that will fit in the overall area are displayed. It is further noted that a viewer can repeat the zoom-in procedure on the resulting zoomed-in clusters until the zoomed-in cluster of interest to the viewer has just one image and that image cannot be increased in size without exceeding the overall area on the display screen dedicated to displaying the clusters.

The procedure used to zoom back out of a previously zoomed-in cluster is essentially the reverse of the zoom-in operation. More particularly, in one embodiment of the present system and process, zooming out involves first decreasing the last established minimum permissible image size by a set zoom-out factor. A revised maximum number of images that can be contained in each cluster is then computed by dividing the maximum cluster area by the decreased minimum permissible image size. Next, the images of the cluster being zoomed out is clustered into sequential "zoomed-out" clusters having no more than the revised maximum number of images in each cluster. Finally, a group of consecutive zoomed-out clusters is displayed on the viewer's display screen. The number of clusters in the group of zoomed-out clusters cannot exceed the number of clusters that are to be displayed at any one time. A viewer can repeat the zoom-out procedure on zoomed-out clusters until the images cannot be decreased in size any further without being smaller than the original minimum permissible image size used to initially cluster the image set.

It is noted that in an alternate procedure, the foregoing zoom-in and zoom-out operations can be performed, not just on the selected cluster, but on all the image data. Thus all the clusters, displayed or not, would be re-clustered at each zoom step. More particularly, the alternate zooming in procedure involves increasing the last established minimum permissible image size by a set zoom-in factor, computing the revised maximum number of images that can be contained in each cluster, and clustering the images of the entire image set into sequential zoomed-in clusters having no more than the revised maximum number of images in each cluster. A group of consecutive zoomed-in clusters is then displayed that were at least in part derived from the cluster being zoomed in on. As for the alternate zooming out procedure, this involves decreasing the last established minimum permissible image size by a set zoom-out factor, computing a revised maximum number of images that can be contained in each cluster, and clustering the images of the entire image set into sequential zoomed-out clusters. A group of consecutive zoomed-out clusters is then displayed that were at least in part derived from the cluster being zoomed out.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
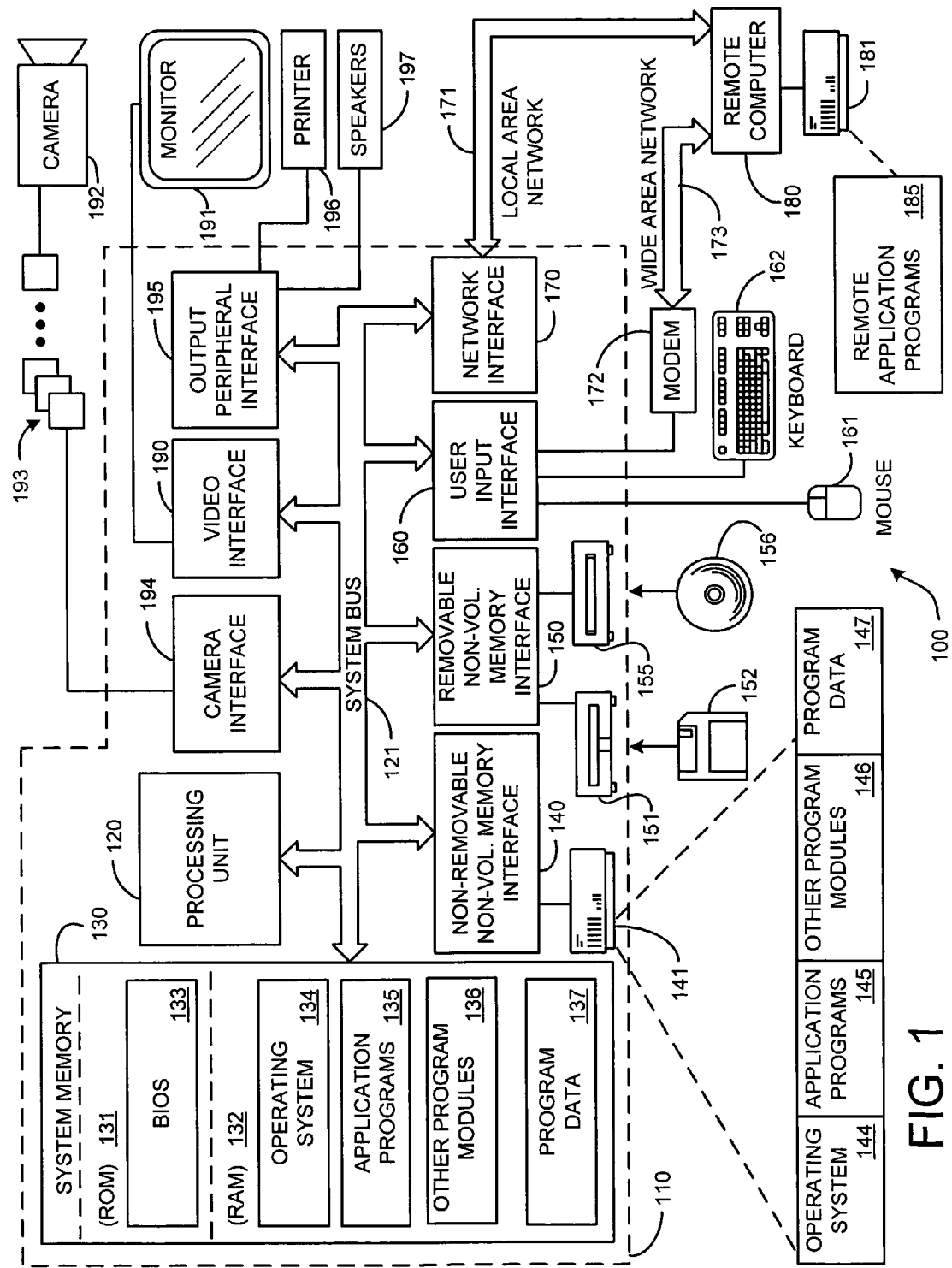
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus

121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 The Graphical User Interface for Navigating a Set of Images

The present image navigation system and process is designed to efficiently navigate large unstructured or loosely structured image data sets, as described previously. In the present invention a viewer can navigate a large set of images in a one dimensional manner by either scrolling or zooming, while the images are presented to the viewer in an efficient two dimensional layout. This one dimensional navigation feature provides an intuitive, almost unconscious, search capability. The viewer moves through the images by scrolling and/or zooming using simple inputs. This allows the viewer to concentrate on the images and the story they tell, rather than the mechanics of the navigation interface.

In order to realize the advantages of the present system and process, the images must first be clustered. Any clustering method can be employed for this purpose although it should have certain features. First, the clustering method is chosen to cluster the images in a manner appropriate to the subject matter of the images. For example, if the time sequence in which the images were created is important, then the images could be clustered according to their creation date. Or perhaps the location where an image was captured is the most important aspect of the data set, and the images have been geo-coded. Alternately, it may be that people depicted in the images are the most important aspect. It that case, the images could be cluster by a person shown in the image, or perhaps by the number of people shown in an image. Another clustering criterion could be how often a viewer has looked at an image in the set.

The clustering method also preferably ranks the images in each cluster based on some criteria appropriate for the subject matter of the images and assign a sequence number to each image. For example, the images might be ranked according to the time they were created, or how far the location captured in the image is from a prescribed location, and so on.

The clustering method employed should also preferably be able to split a previously-defined cluster of images into smaller sub-clusters based on the same criteria as was used to generate the preceding cluster, although this feature is not required in some embodiments of the present invention. Further, the clustering method chosen should be able to divide the images into an instructed number of clusters.

In tested embodiments of the present system and process, a particular clustering method meeting the foregoing requirements was employed. This method is described in a co-pending patent application entitled "Managing Media Objects In A Database, which was filed on Dec. 19, 2001 and assigned Ser. No. 10/021,255. This clustering method produces clusters by looking at time—for instance, the date a picture was taken—and can produce any number of clusters.

Once the image data set under consideration is clustered, the present navigation system and process arranges the clusters in either a left to right, or up and down, manner in an order according to the clustering criteria (e.g., by time or location). Then, a prescribed number of the clusters are displayed to the viewer in their assigned order. The cluster arrangement and number of clusters displayed depends on the type of image data involved, and optionally on the viewer's preferences. For example, it has been found that most people prefer photograph-type image clusters arranged in a left to right pattern, whereas most people preferred web page image clusters arranged in an up and down pattern. As for the number of clusters that are displayed at any one time, this will generally depend on the size of the display being employed by the viewer, and the number and size of the images in the clusters. In tested embodiments involving photograph-type image clusters, three clusters were displayed at any one time—however generally two or more would have been acceptable as long as the individual images in each displayed cluster are reasonably legible. Which group of clusters in the arrangement that are initially displayed can be any desired. For example, the first clusters in the sequence up to the prescribed number could be displayed, or the middle group could be displayed, and so on. It is noted that if the middle group is displayed, the user is an equal distance from the beginning and end of the arrangement, so clusters found at those ends could be reached by scrolling more quickly than say when the beginning clusters are shown and the desired cluster is toward the end. It is also noted that in one embodiment of the present system and process, the foregoing display parameters can be selected ahead of time by the viewer via an appropriate drop-down menu or other GUI selection device, rather than being default values.

As indicated above, the present image navigation system and process allows a viewer to scroll through the clusters. This entails the viewer moving through the clusters to the right or left (or up or down as the case may be) in a conventional manner using "previous" or "next" commands to display clusters that were not previously on the display screen. Any conventional user interface can be employed to accomplish the scrolling task. For example, the left and right (or up and down) arrow keys on a keyboard could be employed for this purpose. Another possibility would to employ a graphic scroll bar that is displayed adjacent the clusters. The scrolling feature allows the viewer to search through the groups of images quickly to find one of interest. This type of scrolling is almost automatic to most computer users and so provides a very intuitive, one dimensional navigation process that allows the viewer to concentrate on the images, rather than the mechanics of the navigation process itself.

Figure 2:
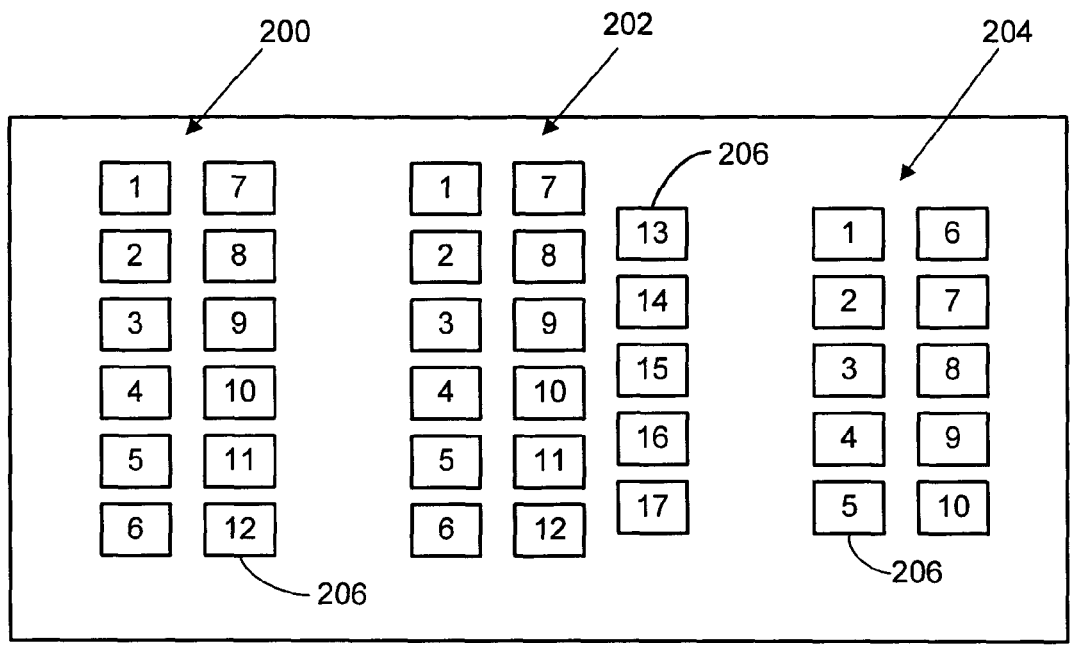
FIG. 2 is a block diagram exemplifying a viewer's display screen showing three image clusters displayed in a left-to-right manner, where each image cluster exhibits a top-to-bottom, left-to-right image grid pattern.

Within each cluster, the present image navigation system and process arranges associated images in a grid in an order dictated by their assigned sequence number. While any pattern could be used, in tested embodiments involving a left to right cluster arrangement, the first image (based on its assigned sequence number) is assigned to the top left corner, the next image is assigned to a location below the first, and so on, column by column, until the last image in the cluster is in the bottom right corner. It is believed this pattern assists the viewer in ascertaining which images have moved to new clusters in a zoom operation that will be described shortly. An example of this arrangement pattern is shown in FIG. 2 where three clusters 200, 202, 204 are displayed.

Notice that each cluster's images 206 are arranged in the aforementioned pattern as indicated by their assigned sequence number which is shown on each image. If a up and down cluster arrangement is used, then a pattern where the first image is assigned to the top left corner, the next item is assigned to a location to the right of the first, and so on, row by row, until the last image in the cluster is in the bottom right corner, could be employed instead. It is believed this latter pattern assists the viewer in ascertaining which images have moved to new clusters in a zoom operation when the clusters are arranged in a up and down manner. However, rather than using the foregoing pattern, it is also possible to allow the pattern to be selected ahead of time by the viewer via an appropriate drop-down menu or other GUI selection device.

It is noted that rather than each image in a displayed cluster lining up with each other along column and row lines, the grid positions can be perturbed a bit so that adjacent images are offset from each other. It is believed that lining the images up implies the subject matter of the images is related and that the images correspond in the sequence shown. However, clustering methods are not always so precise. For example, suppose the clustering method employed used time as the clustering criteria. Also suppose that a person capturing the clustered images took several pictures of a museum early on in a visit and then some time later took one last picture when leaving and then soon thereafter took pictures of a different location. The clustering method would probably cluster the last image of the museum with the images taken at the other location even though the subject matter is not related. However, skewing the imaged rows and columns implies a less accurate grouping so as not to mislead the viewer into believe a precise grouping of subject matter exists.

The displayed clusters can also be highlighted, color coded, and/or labeled to assist the viewer in navigating through the image data. For example, the aforementioned zoom operation that will be described shortly is directed at one cluster in the displayed set at a time. Thus, there is a need to select and identify the cluster it is desired to manipulate. While this can be done in a variety of conventional ways, in tested embodiments the middle cluster in the set of three displayed clusters was automatically selected for processing. If an even number of clusters is displayed, one or the other of the middle two clusters could be similarly selected. The selected cluster can be indicated to the viewer in any conventional manner, such as by shading or coloring the area of the display containing that cluster differently that the other clusters, and/or by surrounding the selected cluster with a box or border of some type, among other methods. The viewer is also able to select a non-selected cluster via any conventional user interface. For example, the viewer might be required to place a screen cursor over the desired cluster using a computer mouse and then "clicking" the mouse to select that cluster in lieu of a previously selected cluster.

The clusters can also be labeled to assist the viewer. For example, a label indicating the range of the clustering criteria applicable to the images of a cluster could be displayed adjacent that cluster. Thus, if the clustering criteria were creation time, for instance, the time period associated with the images contained in the cluster could be displayed adjacent that cluster. Further, individual groups of images within a cluster that are closely related in terms of the clustering criteria could be distinguished from each other. For example, using creation time as the clustering criteria once again, the images within a cluster that were created within some prescribed time from each other could be grouped by shading the area containing these images a different color from the areas containing other images in the cluster. In the previously described scenario where the museum picture was taken close in time to pictures of another location and so assigned to the same cluster, the foregoing color coding procedure might result in the museum picture being colored differently from the pictures of the other location-thus assisting the viewer in quickly separating the subject matter of the images.

Figure 3:
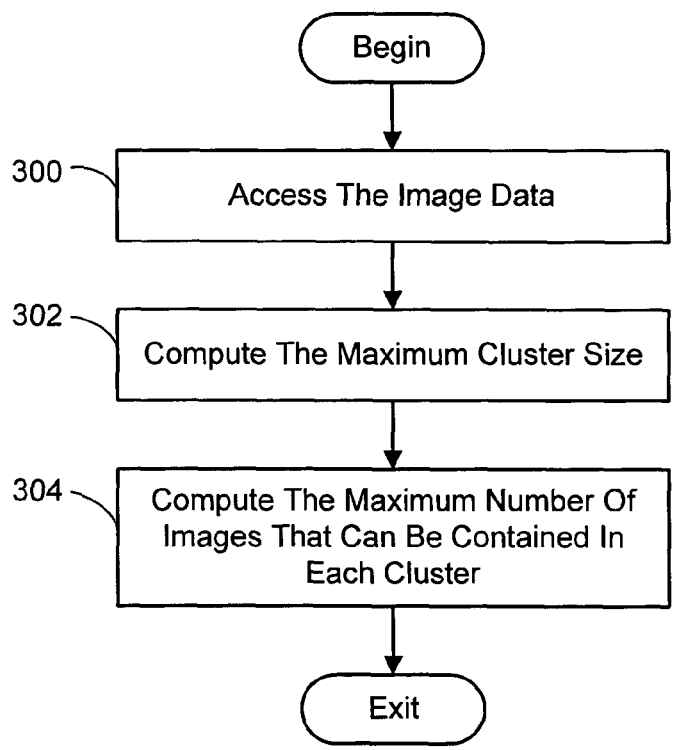
FIG. 3 is a flow chart diagramming a process according to the present invention for computing the maximum number of images that can be contained in each image cluster.

In order for the present image navigation system and process to generate the aforementioned grid of images for each of the displayed clusters, it must be determined how many images can be legibly displayed in each cluster. Referring to FIG. 3, this is generally accomplished by first accessing the image data being navigated (process action 300) and then computing the maximum cluster area (i.e., the maximum area on the viewer's display screen that can be used to display each cluster) given the number of clusters that are to be displayed at any one time and the minimum spacing between clusters (process action 302). The maximum number of images that can be contained in each cluster is then computed given the minimum permissible image size (process action 304).

More particularly, the maximum cluster area S depends on the number of clusters C to be displayed, a minimum allowable spacing between clusters G, and the size of the display area U, V dedicated to the clusters on the viewer's display screen (where U is the width and V is the height). It is noted that the display area could take up all or most of the screen, or just a smaller window within the screen. It is also noted that the foregoing display parameters can be made selectable ahead of time by the viewer via an appropriate drop-down menu or other GUI selection device, or default values could be used. Given the foregoing parameters, S is computed as follows when the clusters are displayed left to right:

$$S=(U-2G)/C \times V. \tag{1}$$

Similarly, S is computed as follows when the clusters are displayed in an up and down pattern:

$$S=U \times (V-2G)/C. \tag{2}$$

Once S is known, the maximum number of images $I_{max}$ that can be displayed in each cluster is computed based on the minimum size of each image H,W including any margin (e.g., the smallest each image can be and still be reasonably legible). It is noted that the actual image can be in any shape (e.g., square, rectangular, circular, oval, irregular, and so on) as long as it fits in an area defined by height H and width W. In addition, the initial minimum image size can be made viewer-selectable or default values could be used. More particularly, $I_{max}$ is computed as:

$$I_{max}=S/HW. \tag{3}$$

As an example, assume the viewer has a 640×480 pixel screen, the minimum size of each image is selected to be 32×32 pixels, and 3 clusters are displayed in a left to right pattern with a minimum separation of 48 pixels. Thus, each cluster can have a maximum area of at most ((640-96)/3)* (480)=87,040 pixels squared. Thus, each cluster can contain at most 87,040/1024=85 images.

Once the maximum number of images per cluster is established, the image data can be clustered using one of the aforementioned clustering methods and a prescribed clustering criterion. If the clustering program is capable of clustering image data into groups having no more than a prescribed number of images in each cluster, then the process is straightforward. The present image navigation system and process simply tells the clustering program how to access the image data and provides the previously established maximum number of images per cluster. As indicated earlier the clustering program then groups the images into clusters and assigns a sequence number to each image in each cluster.

Figure 4A:
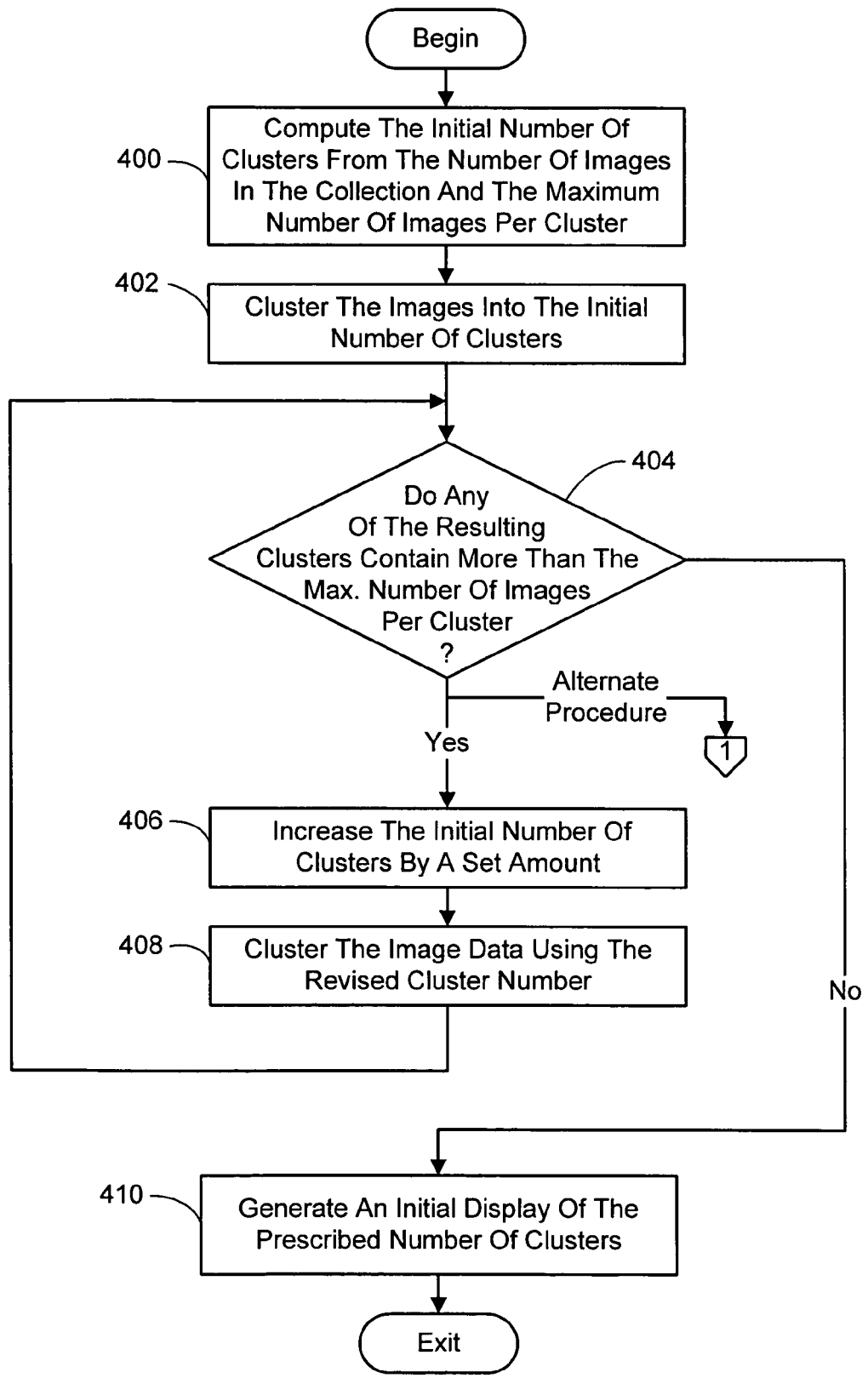
FIGS. 4A-B are flow charts diagramming two alternate processes according to the present invention for generating an initial display of image clusters using the maximum number of images computed via the process of FIG. 3.
Figure 4B:
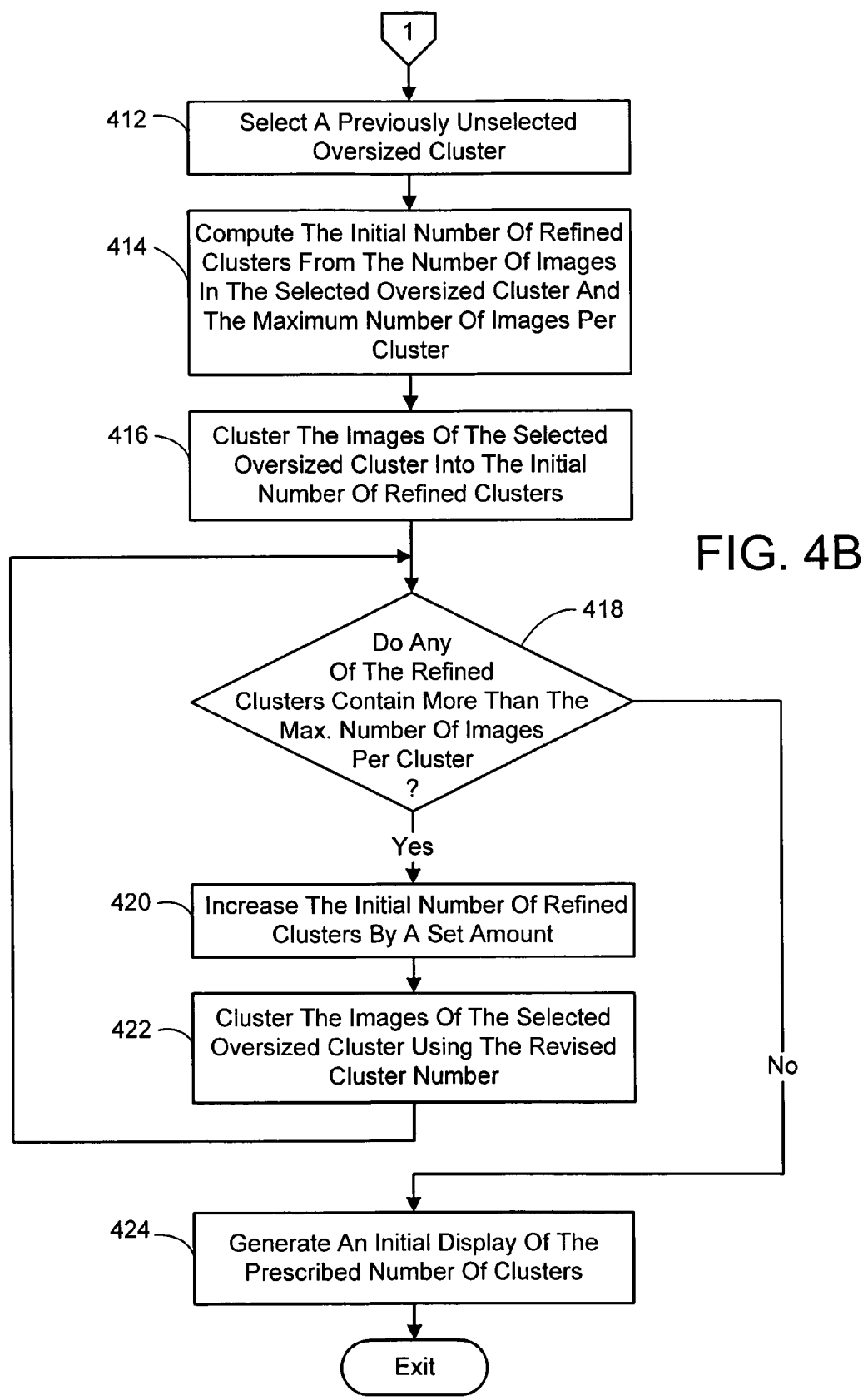

However, if the clustering program employed does not have the capability to cluster while limiting the maximum number of images per cluster, then the present system and process follows a different course of action. More particularly, referring to FIGS. 4A-B, an initial number of clusters N is computed based on the number of images in the collection being processed $I_{total}$ and the maximum number of images per cluster $I_{max}$ (process action 400). Specifically, $$N=I_{total}/I_{max}. \quad (4)$$

For instance, if there are 2000 images in the collection under consideration and the maximum number of images per cluster is 85, the initial number is 24 clusters.

Next, the clustering program being employed is instructed to cluster the images into N clusters (process action 402). It is then determined if any of the resulting clusters contain more than the maximum number of images permitted per cluster (process action 404). If it is determined that any of the clusters exceed the maximum number of images permitted, the oversized clusters are refined to limit each of them to no more than the previously established maximum number. One way to accomplish this task is to increase the previously computed initial number of clusters by a set (default or viewer-selected) amount (process action 406) and then instruct the clustering program cluster the image data using the revised cluster number (process action 408). The process actions of determining if any of the resulting clusters exceeds the maximum number of images permitted, increasing the last computed number of clusters by a prescribed amount if any cluster exceeds the permitted number and re-clustering the image data using the revised cluster number (i.e., process actions 404 through 408), are repeated until none of the resulting clusters exceeds the maximum number of images. Once the clusters and their contents are established, the present system and process generates an initial display of the prescribed number of clusters C in the manner described previously using conventional rendering methods (process action 410), and the initial clustering and display process ends.

Another option to limit each of the clusters to no more than the previously established maximum number of images after the initial clustering (if needed) is to divide only the cluster or clusters exceeding the limit, rather than re-clustering all the image data. One way to divide each oversized cluster is to re-cluster it similar to the way the entire collection was re-clustered in the previously described embodiment. Namely, referring to the alternate actions in FIG. 4B, an oversized cluster is selected (alternate process action 412), and an initial number of refined clusters $N_r$ is computed based on the number of images in the oversized cluster being divided $I_{OC}$ and the maximum number of images per cluster $I_{max}$ (alternate process action 414). Specifically, $$N_r=I_{oc}/I_{max}. \quad (5)$$

Next, the clustering program being employed is instructed to cluster the images of the oversized cluster into $N_r$ clusters (alternate process action 416). It is then determined if any of the resulting refined clusters contain more than the maximum number of images (alternate process action 418). If so, the previously computed initial number of refined clusters is increased by a default or viewer-selected amount (process action 420) and then the clustering program is instructed to cluster the selected oversized cluster's images using the revised cluster number (process action 422). The process actions of determining if any of the resulting refined clusters exceeds the maximum number of images permitted, increasing the last computed number of clusters by a prescribed amount if any cluster exceeds the permitted number and re-clustering the images of the selected oversized cluster using the revised cluster number (i.e., process actions 418 through 422), are repeated until none of the resulting refined clusters exceeds the maximum number of images. Here again, once the clusters and their contents are established, the present system and process generates an initial display of the prescribed number of clusters C in the manner described previously using conventional rendering methods (process action 424), and the initial clustering and display process ends.

It is noted that a combination of the foregoing clustering approaches could also be employed as desired. In any case, regardless of which clustering approach is used, the result of the clustering is a set of N or more clusters, each of which has $I_{max}$ or fewer images.

Once the initial clustering is displayed, the viewer is free to scroll through the clusters with the present system and process rendering each new cluster as appropriate. In addition to scrolling through the clusters, as indicated previously, the viewer can also zoom in, and then out of a selected cluster. Zooming into a selected cluster allows a user to see progressively larger and larger versions of the images contained in the cluster. Thus, for example, a viewer can quickly scroll through the clusters to identify a general subject matter he or she is interested in, and then can increase the size of the images of that cluster to identify a particular group or individual image of interest. The viewer then zooms back out to quickly identify other images or groups of images of interest.

Figure 5:
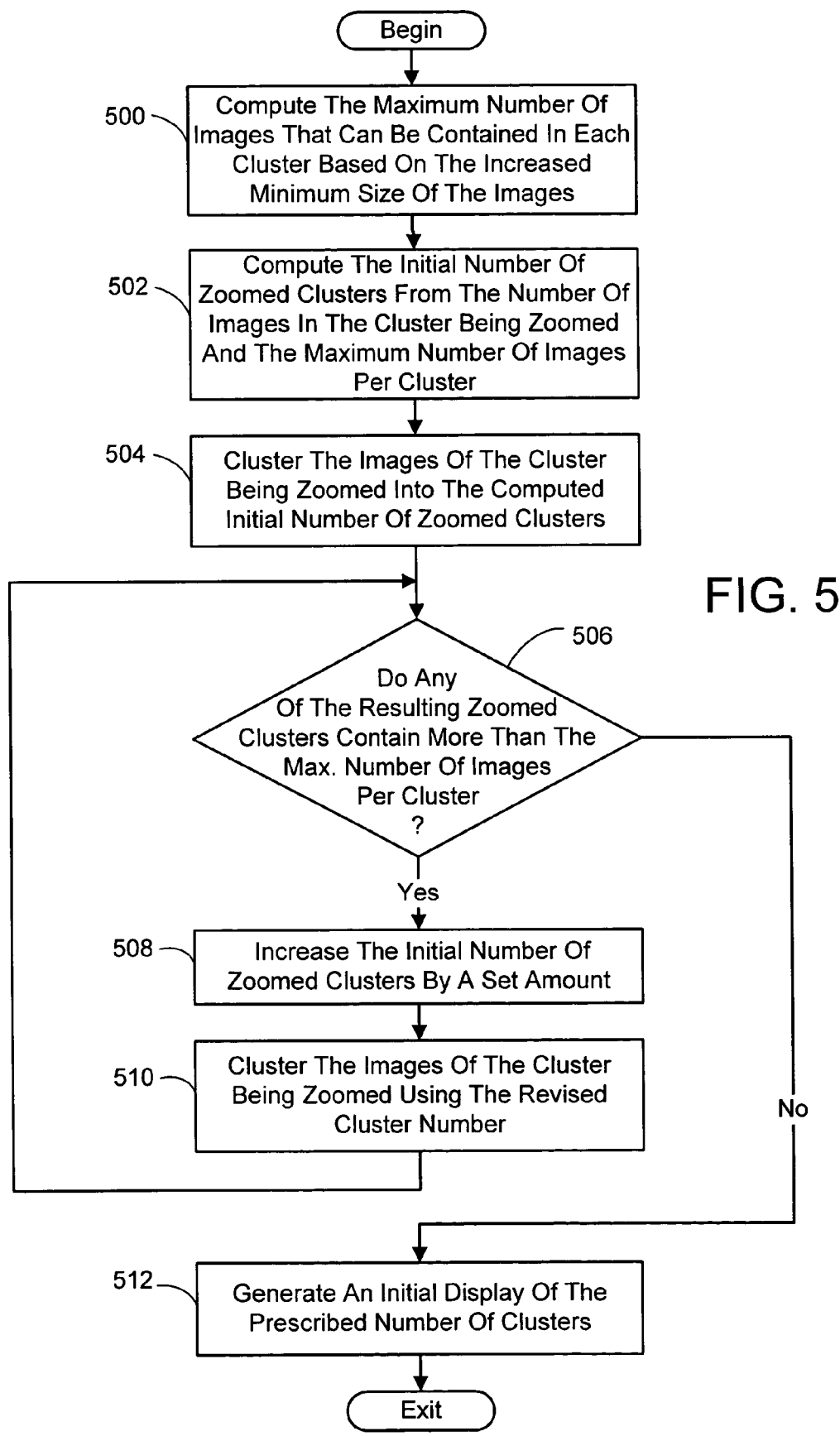
FIG. 5 is a flow chart diagramming a process according to the present invention for generating a display of zoomed-in image clusters in response to a viewer zoom-in command.

The procedure used by the present image navigation system and process to zoom in on a selected cluster involves the viewer entering a "zoom-in" command. This can be accomplished using any conventional user interface. For example, the viewer might be required to press a key on a keyboard to zoom in, such as the up arrow key in the case of a left to right cluster pattern, or some other designated key in the case of an up and down cluster pattern. Zooming in works by increasing the minimum image size described earlier by a set zoom-in factor (for example by a factor of two) each time the zoom in command is entered. Whenever the minimum image size is increased, the selected cluster is re-clustered in a manner similar to that described above in connection with the re-clustering of an oversized cluster. More particularly, referring to FIG. 5, first the new maximum number of images $I_{zmax}$ is computed based on the increased minimum size of each image $H_{in}, W_{in}$ (process action 500). More particularly, $I_{zmax}$ is computed as:

$$I_{zmax}=S/H_{in}W_{in}, \quad (6)$$

where S is the originally computed maximum cluster area. Next, an initial number of zoomed clusters $N_z$ is computed based on the number of images in the cluster being zoomed $I_{ZC}$ and the maximum number of images $I_{max}$ (process action 502). Specifically, $$N_z=I_{ZC}/I_{zmax}. \quad (5)$$

Next, the clustering program is instructed to cluster the images of the cluster being zoomed into $N_z$ clusters (process action 504). It is then determined if any of the resulting clusters contain more than the maximum number of images (process action 506). If so, one way to limit each resulting cluster to the maximum number of images is to increase the previously computed initial number of clusters by a prescribed amount (process action 508) and then instruct the clustering program to cluster the cluster's images using the revised cluster number (process action 510). The process actions of determining if any of the resulting clusters exceeds the maximum number of images permitted, increasing the last computed number of clusters by a prescribed amount if any cluster exceeds the permitted number and re-clustering the images of the cluster being zoomed using the revised cluster number (i.e., process actions 506 through 510), are repeated until none of the resulting zoomed clusters exceeds the maximum number of images. Another way to limit each resulting cluster to the maximum number of images is to re-cluster just the oversized clusters in the manner described earlier in connection with establishing the initial clusters (not shown in FIG. 5). Once the zoomed-in clusters and their contents are established, the present system and process generates an initial display of the clusters in the manner described previously using conventional rendering methods (process action 512), and the process of creating an initial display of the zoomed in cluster ends.

It is noted that if the clustering program being employed has the capability to clustering image data into groups having no more than a prescribed number of images in each cluster, then process actions 502 through 510 of the foregoing procedure would be replaced with a single action of ordering the clustering of the image data into clusters having no more images each than the previously established maximum number of images per cluster.

Figure 6:
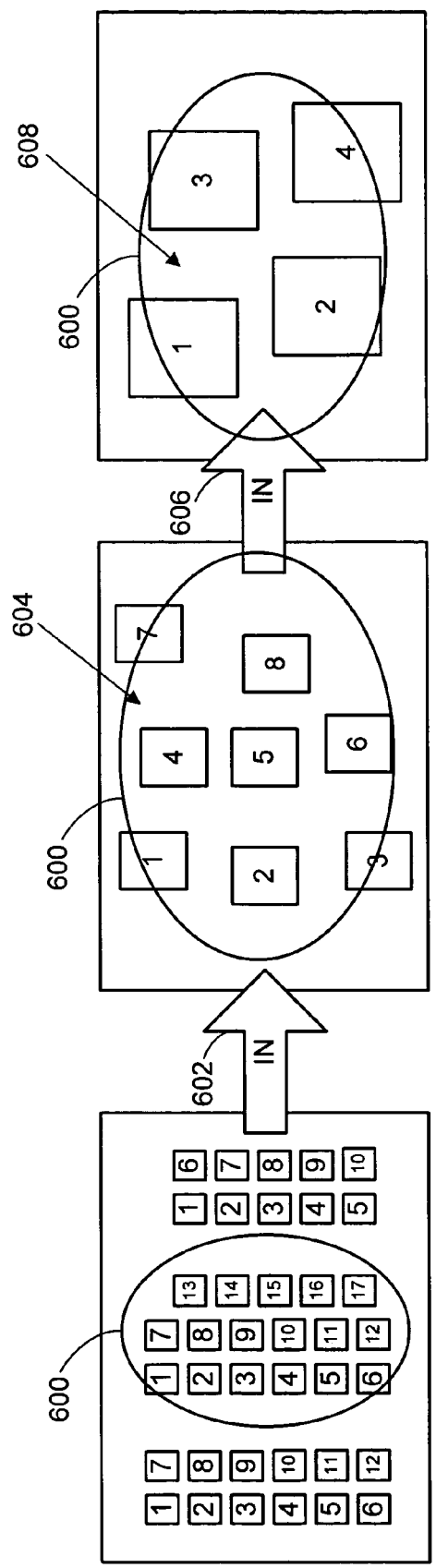
FIG. 6 is a block diagram exemplifying what the viewer's display screen might look like over two consecutive zoom-in operations.

The result of each "zoom-in" operation is a sequence of new clusters created from the selected cluster, which will typically have fewer and larger images. It is possible to employ conventional graphics methods to smoothly animate each image to its new location among the displayed image clusters to provide an added visual indication to the viewer of how the images have been divided. It is noted that the originally assigned sequence numbers are preferably retained such that the re-clustering operation does not result in out-of-sequence images being included in a newly formed cluster. However, this need not necessarily be the case. FIG. 6 shows an example of two consecutive zoom-in actions. In is noted that the ovals 600 seen FIG. 6 indicate which cluster is selected.

The zoom-in action can be repeated as desired by the viewer by selecting a newly formed cluster displayed on his or her screen and entering the appropriate command. It is noted that if the minimum image size becomes so large that it is no longer possible to display the initially prescribed number of separate clusters (i.e., C) in their entirety on the screen, then this requirement is lowered as needed, until eventually only one cluster is displayed on the screen. This is shown in FIG. 6, where after the first zoom-in operation 602, only one cluster 604 could be displayed (i.e., the cluster having images assigned sequence numbers 1-8). Any further zoom-in operation would simply reduce the number of images shown in the one cluster displayed on the screen, as shown in FIG. 6 after the second zoom-in operation 606, where the resulting cluster 608 has just images with assigned sequence numbers 1-4. This process would continue until all the newly formed clusters after the last zoom-in operation contain just one image. It is noted that the viewer can still scroll through the newly formed clusters of the last cluster zoomed in on. Thus, even if the displayed cluster contains only one image, scrolling might reveal that other clusters still have more than one image. These clusters can be zoomed in on until one image can be displayed in all the resulting new clusters. It is further noted, that even if just one image is shown in a new cluster following a zoom operation, it might be that the entire area allotted to displaying clusters is not filled. In that case the viewer can enter a zoom-in command and the size of the image in the displayed cluster would increase as long as its new size did not exceed the allotted display area. In this way a viewer can eventually zoom-in on a single image and display it in as large a size as possible given the allotted screen space available. Thus, the exact number of times that the viewer can zoom in depends on the zoom factor and the size of the images relative to the size of the allotted screen space.

The procedure used by the present image navigation system and process to zoom back out of a previously zoomed-in cluster is essentially the reverse of the zoom-in operation. More particularly, the viewer selects a displayed cluster that was the result of a previous zoom-in operation and then enters a "zoom-out" command. This can be accomplished using any conventional user interface, as with the zoom-in command. For example, the viewer might be required to press a key on a keyboard to zoom out, such as the down arrow key in the case of a left to right cluster pattern, or some other designated key in the case of an up and down cluster pattern. Zooming out works by decreasing the minimum image size described earlier by a set zoom-out factor. This zoom-out factor is preferably the inverse of the zoom-in factor, although this need not be the case. If it is, then for example, if the zoom-in factor was two, the zoom-out factor would be one-half.

Figure 7:
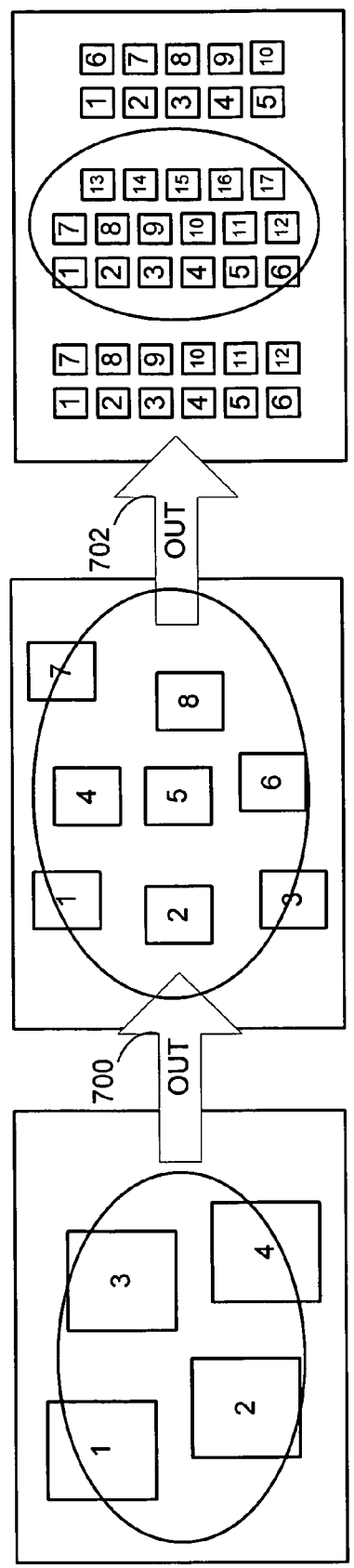
FIG. 7 is a block diagram exemplifying what the viewer's display screen might look like over two consecutive zoom-out operations.

The zooming out procedure is exactly the same as the zooming in procedure, except that it results in a sequence of new clusters created from the selected cluster that will have more numerous but smaller images. FIG. 7 shows an example of two consecutive zoom-out actions 700, 702. The zoom-out action can be repeated by the viewer by selecting a newly formed cluster displayed on his or her screen and entering the appropriate command. The zooming-out can continue until the last application of the zoom-out factor result in images that cannot be decreased in size without being smaller than the original minimum permissible image size used to initially cluster the image set. No further zooming out is permitted after this last re-clustering.

It is noted that in an alternate procedure, the foregoing zoom-in and zoom-out operations can be performed, not just on the selected cluster, but on all the image data. Thus all the clusters, displayed or not, would be re-clustered at each zoom step. The displayed clusters would still be derived from the selected cluster. However, this alternate procedure would allow the viewer to scroll through all the image clusters, regardless of if they were derived from the selected cluster, albeit at an increased processing cost.

Wherefore, what is claimed is:

1. A computer-implemented process for a viewer to navigate unstructured or loosely structured image sets on a display screen, comprising:
using a computer to perform the following process actions:
accessing the image set being navigated;
computing a cluster area, wherein the cluster area is defined as the maximum area on the viewer's display screen that can be used to display each cluster of a group of clusters given a maximum number of clusters that are to be displayed at any one time, an overall area on the display screen dedicated to displaying the clusters and a minimum spacing between clusters, and wherein the cluster area is the same size for each of the clusters;
computing a maximum number of images that can be contained in each cluster given a minimum permissible image size and the cluster area, wherein the maximum number of images computed for a cluster is allowed to be different than the maximum number of images computed for another cluster while at the same time the cluster area remains the same size for each of the clusters;
clustering the images of the accessed image set into sequential clusters having no more than the maximum number of images in each cluster; and
displaying a group of consecutive clusters on the viewer's display screen, wherein number of clusters in the group of clusters does not exceed said number of clusters that are to be displayed at any one time.

2. The process of claim 1, wherein the process action of clustering the images of the accessed image set into clusters having no more than the maximum number of images in each cluster, comprises the actions of:
   (a) computing a permissible number of clusters by dividing the number of images in the image set by the maximum number of images per cluster;
   (b) clustering the image set into the permissible number of clusters;
   (c) determining if any of the resulting clusters contain more than the maximum number of images per cluster;
   (d) whenever it is determined that any of the clusters exceed the maximum number of images per cluster, increasing the permissible number of clusters by a set amount and repeating actions (b) through (d);
   (e) whenever it is determined that none of the clusters exceed the maximum number of images per cluster, deeming that the images of the image set have been clustered into clusters having no more than the maximum number of images.

3. The process of claim 1, wherein the process action of clustering the images of the accessed image set into clusters having no more than the maximum number of images in each cluster, comprises the actions of:
   computing a permissible number of clusters by dividing the number of images in the image set by the maximum number of images per cluster;
   clustering the image set into the permissible number of clusters;
   determining if any of the resulting clusters contain more than the maximum number of images per cluster;
   for each cluster determined to exceed the maximum number of images per cluster,
      (i) computing a permissible number of refined clusters by dividing the number of images in the oversized cluster under consideration by the maximum number of images per cluster,
      (ii) clustering the images of the oversized cluster under consideration into the permissible number of refined clusters,
      (iii) determining if any of the resulting refined clusters contain more than the maximum number of images per cluster, and
      (iv) for each refined cluster determined to exceed the maximum number of images per cluster, repeating actions (i) through (iv); and
   whenever it is determined that none of the refined clusters exceed the maximum number of images per cluster, deeming that the images of the image set have been clustered into clusters having no more than the maximum number of images.

4. The process of claim 1, wherein the number of image clusters is too large for all of them to be displayed at one time on the viewer's display screen, and wherein said process further comprises an action of, in response to a scroll command entered by the viewer, scrolling the image clusters displayed on the screen so as to sequentially bring clusters not currently displayed into view, while still limiting the number of clusters displayed at any one time to a number that does not exceed said maximum number of clusters that are to be displayed.

5. The process of claim 1, further comprising a process action of zooming in on a cluster displayed on the display screen in response to a zoom-in command entered by the viewer, wherein said zooming in comprises increasing the minimum permissible image size and results in at least the images of the cluster being zoomed in on being shown at a larger size in the zoomed-in clusters.

6. The process of claim 5, wherein the process action of zooming in on a cluster displayed on the display screen, comprises the actions of:
   increasing the last established minimum permissible image size by a set zoom-in factor;
   computing a revised maximum number of images that can be contained in each cluster by dividing the cluster area by the increased minimum permissible image size;
   clustering the images of the cluster being zoomed in on into sequential zoomed-in clusters having no more than the revised maximum number of images in each cluster; and
   displaying a group of consecutive zoomed-in clusters on the viewer's display screen, wherein the number of clusters in the group of zoomed-in clusters does not exceed said number of clusters that are to be displayed at any one time.

7. The process of claim 6, wherein the process action of clustering the images of the cluster being zoomed in on into sequential zoomed-in clusters having no more than the revised maximum number of images in each cluster, comprises the actions of:
   computing a permissible number of zoomed clusters by dividing the number of images in the cluster being zoomed in on by the last computed maximum number of images per cluster;
   clustering the images of the cluster being zoomed in on into the permissible number of zoomed-in clusters;
   determining if any of the resulting zoomed-in clusters contain more than the revised maximum number of images per cluster;
   for each zoomed-in cluster determined to exceed the revised maximum number of images per cluster,
      (i) computing a permissible number of refined zoomed-in clusters by dividing the number of images in the oversized zoomed-in cluster under consideration by the maximum number of images per cluster,
      (ii) clustering the images of the oversized zoomed-in cluster under consideration into the permissible number of refined zoomed-in clusters,
      (iii) determining if any of the resulting refined zoomed-in clusters contain more than the maximum number of images per cluster, and
      (iv) for each refined zoomed-in cluster determined to exceed the maximum number of images per cluster, repeating actions (i) through (iv); and
   whenever it is determined that none of the refined zoomed-in clusters exceed the maximum number of images per cluster, deeming that the images of the cluster being zoomed in on have been clustered into zoomed-in clusters having no more than the revised maximum number of images.

8. The process of claim 6, wherein the process action of clustering the images of the cluster being zoomed in on into sequential zoomed-in clusters having no more than the revised maximum number of images in each cluster, comprises the actions of:
   (a) computing a permissible number of zoomed clusters by dividing the number of images in the cluster being zoomed in on by the last computed maximum number of images per cluster;
   (b) clustering the images of the cluster being zoomed in on into the permissible number of zoomed-in clusters;

(c) determining if any of the resulting zoomed-in clusters contain more than the revised maximum number of images per cluster;
(d) whenever it is determined that any of the zoomed-in clusters exceed the revised maximum number of images per cluster, increasing the permissible number of zoomed clusters by a set amount and repeating actions (b) through (d); and
(e) whenever it is determined that none of the zoomed-in clusters exceed the last-computed revised maximum number of images per cluster, deeming that the images of the cluster being zoomed in on have been clustered into zoomed-in clusters having no more than the revised maximum number of images.

9. The process of claim 5, wherein the process action of zooming in on a cluster displayed on the display screen, comprises the actions of:
increasing the last established minimum permissible image size by a set zoom-in factor;
computing a revised maximum number of images that can be contained in each cluster by dividing the cluster area by the increased minimum permissible image size;
clustering the images of the entire image set into sequential zoomed-in clusters having no more than the revised maximum number of images in each cluster; and
displaying a group of consecutive zoomed-in clusters that were at least in part derived from the cluster being zoomed in on, wherein the number of clusters in the group of zoomed-in clusters does not exceed said number of clusters that are to be displayed on the viewer's display screen at any one time.

10. The process of claim 5, wherein the process action of zooming in on a cluster displayed on the display screen in response to a zoom-in command entered by the viewer can be repeated on any zoomed-in cluster, and wherein, whenever the minimum permissible image size becomes so large that it is no longer possible to display the maximum number of clusters that are to be displayed at any one time in their entirety in the overall area on the display screen dedicated to displaying the clusters, only the number of clusters that will fit in said overall area are displayed.

11. The process of claim 10, wherein the process action of zooming in on a cluster displayed on the display screen in response to a zoom-in command entered by the viewer can be repeated on any zoomed-in cluster until the resulting zoomed-in cluster of interest to the viewer comprises just one image and that image cannot be increased in size without exceeding the overall area on the display screen dedicated to displaying the clusters.

12. The process of claim 5, further comprising a process action of zooming out on a zoomed-in cluster displayed on the display screen in response to a zoom-out command entered by the viewer, wherein said zooming out comprises decreasing the minimum permissible image size and results in at least the images of the cluster being zoomed-out being shown at a smaller size in resulting zoomed-out clusters.

13. The process of claim 12, wherein the process action of zooming out on a zoomed-in cluster displayed on the display screen, comprises the actions of:
decreasing the last established minimum permissible image size by a set zoom-out factor;
computing a revised maximum number of images that can be contained in each cluster by dividing the cluster area by the decreased minimum permissible image size;
clustering the images of the cluster being zoomed out into sequential zoomed-out clusters having no more than the revised maximum number of images in each cluster; and
displaying a group of consecutive zoomed-out clusters on the viewer's display screen, wherein the number of clusters in the group of zoomed-out clusters does not exceed said number of clusters that are to be displayed at any one time.

14. The process of claim 12, wherein the process action of zooming out on a zoomed-in cluster displayed on the display screen, comprises the actions of:
decreasing the last established minimum permissible image size by a set zoom-out factor;
computing a revised maximum number of images that can be contained in each cluster by dividing the cluster area by the decreased minimum permissible image size;
clustering the images of the entire image set into sequential zoomed-out clusters having no more than the revised maximum number of images in each cluster; and
displaying a group of consecutive zoomed-out clusters that were at least in part derived from the cluster being zoomed out, wherein the number of clusters in the group of zoomed-out clusters does not exceed said number of clusters that are to be displayed on the viewer's display screen at any one time.

15. The process of claim 12, wherein the process action of zooming out on a zoomed-in cluster displayed on the display screen in response to a zoom-out command entered by the viewer can be repeated on any zoomed-out cluster until the resulting zoomed-out cluster of interest to the viewer comprises images that cannot be decreased in size without being smaller than the original minimum permissible image size used to initially cluster the image set.

16. A computer-readable medium storage having computer-executable instructions stored thereon for performing the process actions recited in claim 1.

17. A system for viewer navigation of unstructured or loosely structured image sets on a display screen, comprising:
a general purpose computing device comprising a display screen; and
a computer program comprising program modules executable by the computing device, wherein the computing device is directed by the program modules of the computer program to graphically display in an image cluster window the results of a clustering operation which grouped the images of an image set under consideration into sequential clusters each comprising no more than a maximum number of images that can be displayed given a minimum permissible image size and a per cluster display area which is the same size for each cluster, wherein the maximum number of images of a cluster is allowed to be different than the maximum number of images of another cluster while at the same time the cluster area remains the same size for each of the clusters, said image cluster window comprising a cluster display sector which displays a group of consecutive clusters not exceeding a set number, wherein the group of clusters is arranged in either a left-to-right or up-and-down configuration, and wherein the images in each cluster each have a sequence number assigned to it during the clustering operation and are displayed in a grid pattern in a sequence number order.

18. The system of claim 17, wherein the images are displayed in a grid pattern such that adjacent images are offset from each other in relation to the columns and rows of the grid.

19. The system of claim 17, wherein the viewer is able to scroll through the clusters so as to bring clusters not currently displayed into view, and to zoom in and out of a selected one of the displayed clusters, and wherein the selected cluster is highlighted in a manner that makes it visually distinguishable from the non-selected clusters.

20. A computer-implemented process for a viewer to navigate unstructured or loosely structured images on a display screen, comprising:

using a computer to perform the following process steps:

a first computing step for computing a cluster area defined as the maximum area on the viewer's display screen that can be used to display a cluster of images from said images, wherein the size of the cluster area is the same for each of the clusters;

a second computing step for computing a maximum number of images that can be contained in each image cluster, among a plurality of image clusters, given a minimum permissible image size and the cluster area, wherein the maximum number of images computed for a cluster is allowed to be different than the maximum number of images computed for another cluster while at the same time the cluster area remains the same size for each of the clusters;

a clustering step for clustering said images into sequential image clusters having no more than the maximum number of images in each cluster; and a displaying step for displaying a group of consecutive clusters on the viewer's display screen, wherein the number of clusters in the group of clusters does not exceed a set number of clusters that are to be displayed at any one time.

* * * * *